United States Patent [19]

Pazos

[11] Patent Number: 5,773,525

[45] Date of Patent: Jun. 30, 1998

[54] PROCESS OF OXYALKYLATION EMPLOYING SOLID, HETEROGENEOUS OXYALKYLATION CATALYSTS

[75] Inventor: José F. Pazos, Havertown, Pa.

[73] Assignee: Arco Chemical Technology, L.P., Greenville, Del.

[21] Appl. No.: 880,040

[22] Filed: Jun. 20, 1997

Related U.S. Application Data

[62] Division of Ser. No. 554,010, Nov. 6, 1995, Pat. No. 5,679,764.

[51] Int. Cl.[6] .................................................... C08G 65/28
[52] U.S. Cl. ........................ 525/409; 568/608; 568/609; 568/618; 568/619
[58] Field of Search ............................................ 525/409

[56] References Cited

U.S. PATENT DOCUMENTS

| | | | |
|---|---|---|---|
| 5,012,012 | 4/1991 | Nakamura et al. | 568/618 |
| 5,136,106 | 8/1992 | King | 568/618 |
| 5,417,808 | 5/1995 | Okamoto et al. | 252/174.22 |
| 5,679,764 | 10/1997 | Pazos | 528/405 |

FOREIGN PATENT DOCUMENTS

| | | |
|---|---|---|
| 3-242241 | 1/1992 | Japan . |
| 6-115587 | 7/1994 | Japan . |

OTHER PUBLICATIONS

Derwent accession No. 91–364199/50 for Japanese Patent No. 3–242241, Lion Corp., Oct. 1991.
Derwent accession No. 94–174017/21 for Japanese Patent No. 61–16587, Lion Corp., Apr. 1994.

*Primary Examiner*—Mukund J. Shah
*Assistant Examiner*—Pavanaram K. Sripada
*Attorney, Agent, or Firm*—Jonathan L. Schuchardt

[57] ABSTRACT

Oligomeric polyoxyalkylene polyethers are prepared by oxyalkylating a low molecular weight hydroxyl-functional starter molecule with one or more alkylene oxides in the presence of a solid, heterogeneous magnesium oxide catalyst. The catalyst is readily and rapidly removed by simple filtration to yield a polyether with minimal metal ion content suitable for use directly or as a starter molecule for further double metal cyanide complex catalyzed oxyalkylation.

3 Claims, No Drawings

PROCESS OF OXYALKYLATION EMPLOYING SOLID, HETEROGENEOUS OXYALKYLATION CATALYSTS

This is a division, of application Ser. No. 08/554,010, filed Nov. 6, 1995.

TECHNICAL FIELD

The present invention pertains to oxyalkylation of suitably hydric initiator molecules to produce oligomeric polyoxyalkylene polyethers. More particularly, the present invention pertains to oxyalkylation in the presence of solid, heterogeneous catalysts which can be readily removed from the polyoxyalkylene polyether product without resorting to neutralization or adsorbent treatment.

BACKGROUND ART

Polyoxyalkylene polyols have a myriad of industrial uses. Monofunctional polyoxyalkylene polyethers have applications as surface active agents, reactive plasticizers, and the like. Di- and polyfunctional polyoxyalkylene polyethers (polyether polyols) may be used to prepare polyesters by reaction with dicarboxylic acids or their derivatives, and particularly, a wide variety of polyurethane polymers by reaction with an organic di- or polyisocyanate.

In the past, oxyalkylation of a suitably hydric initiator such as a monofunctional alkanol or polyfunctional diol, triol, or the like, was performed with homogenous, highly basic catalysts such as sodium or potassium hydroxide or the corresponding alkoxides. Under the reaction conditions employed, oxyalkylation with propylene oxide is accompanied by a competing rearrangement of propylene oxide to allyl alcohol, a monohydric initiator which competes with the desired initiator for oxypropylation with propylene oxide. This rearrangement is discussed in BLOCK AND GRAFT POLYMERIZATION, Ceresa, Ed., John Wiley & Sons, New York, at pages 17–21, and to date, the mechanism is still subject to debate. Whatever the mechanism, the result is continued generation of monofunctional, allylic unsaturation-containing polyoxypropylene monols.

During preparation of monofunctional polyoxypropylene polyethers, the effect of the continued generation and subsequent oxypropylation of allyl alcohol does not alter the average functionality of the product, but the average molecular weight is lowered and the molecular weight distribution (polydispersity) altered in generally undesirable ways. Moreover, the reactive allylic unsaturation is prone to oxidation as well as a variety of addition reactions. When the initiator is a long chain alkanol, desired to impart hydrophobic character, the high mol percentage of relatively short allyl alcohol moieties can drastically alter surface active properties in high molecular weight non-ionic surfactants.

In the case where higher hydric initiators with functionalities of e.g. 2 to 8 or higher are used, as is generally the case for polyoxyalkylene polyethers for polyurethanes, the propylene oxide/allyl alcohol rearrangement is far more deleterious. For example, oxypropylation of propylene glycol or dipropylene glycol to produce polyoxypropylene diols is generally limited to products having a molecular weight of c.a. 4000 Da, or a 2000 Da equivalent weight product. Even at this modest equivalent weight, such a polyoxypropylene diol will contain up to 50 mol percent monol. The average functionality of the polyether product is lowered from a theoretical, calculated functionality of 2.0, to a measured functionality of from 1.5 to 1.7.

In addition to the above-mentioned drawbacks associated with the use of basic oxyalkylation catalysts, in general, the oxyalkylation catalyst must be removed and/or neutralized. In general, removal is facilitated by treatment of the polyether product with an adsorbent, for example, magnesium silicate, followed by filtration. Use of such adsorbents increases costs, and the filtration adds undesirably to the process time, thus lowering throughput or requiring additional capitalization to provide separate vessels to hold the product being filtered. The magnesium silicate filter cake is sometimes pyrophoric, and in any case, must be disposed of by environmentally acceptable methods.

Many efforts have been made to reduce the unsaturation in polyether polyols by minimizing allyl alcohol formation. To this end, it has been proposed in U.S. Pat. No. 3,393,243 to employ cesium hydroxide or rubidium hydroxide as catalysts. However, these catalysts, although somewhat effective in reducing unsaturation, are far more expensive than their lighter alkali metal analogs, and still require adsorbent treatment for removal. Furthermore, due to the higher atomic weight of the alkali metal involved, a greater weight percentage must be used to provide the same mol percent of catalyst. In U.S. Pat. No. 4,282,387, the use of calcium, strontium, or barium carboxylates such as calcium naphthenate is disclosed, without subsequent residual catalyst removal. However, the effect on unsaturation is undocumented, and the high levels of residual catalyst are unsuited for many applications, particularly those related to coatings or containers for food products.

In U.S. Pat. Nos. 5,010,187 and 5,114,619 are disclosed the use of higher alkaline earth metal oxides and hydroxides, for example barium and strontium oxides and hydroxides, as oxyalkylation catalysts. Unsaturation is lowered somewhat, however, catalyst residues must still be removed via neutralization and/or adsorption. Use of catalysts containing strontium requires particular emphasis on catalyst removal due to the documented toxicity of strontium.

In the decades of the 1960's and 70's, double metal cyanide complex (DMC complex) catalysts were introduced for oxypropylation. These catalysts, such as a non-stoichiometric zinc hexacyanocobaltat-glyme complex, were found to be highly efficient catalysts for oxypropylation under certain conditions. Polyether polyols of much higher molecular weight than previously available could be produced. For polyoxypropylene diols having equivalent weights of c.a. 2000 Da, the unsaturation was in the range of 0.015 to 0.020 meq/g as compared to 0.07 to 0.09 meq/g for otherwise similar base-catalyzed polyols.

However, the oxyalkylation of hydric initiators with DMC complex catalysts has been found to be inefficient when the molecular weight of the initiator molecule is below about 400 Da. For example, propylene glycol, glycerine, and trimethylolpropane, all common initiators in base-catalyzed oxyalkylation, are generally unacceptable when DMC complex catalysts are utilized. In their stead, oligomeric polyoxyalkylene polyethers based on such initiators must be used. Such oligomeric products, for example a 450 Da molecular weight oxypropylated glycerine, must be first prepared by conventional methods such as base catalysis. However, the basic oxyalkylation catalysts used to prepare the oligomeric starter molecules must be removed prior to further DMC complex catalyzed oxyalkylation, as they are known to poison or otherwise inhibit DMC complex catalysts. The removal of catalyst residues, as indicated before, adds unwanted time and expense to the overall process.

It would be desirable to provide a process for oxyalkylation, particularly oxypropylation, whereby oligomeric polyoxyalkylene polyethers may be produced with minimal treatment to remove catalyst residues. Such oligomeric polyether products are useful in and of themselves, and are particularly useful as initiator molecules for further oxyalkylation in the presence of DMC complex oxyalkylation catalysts.

SUMMARY OF THE INVENTION

It has now been surprisingly discovered that magnesium oxide is a suitable oxyalkylation catalyst for preparation of oligomeric oxyalkylation products, despite the catalyst being heterogeneous. It has further been surprisingly discovered that magnesium oxide catalysts are not solubilized in the oxyalkylation product, and may be removed by rapid, simple filtration, to provide a polyether product with minimal metal ion content. Most surprisingly, these catalysts are far more effective than basic metallic oxides such as aluminum oxide and calcium oxide, despite the latter's higher alkalinity.

DESCRIPTION OF THE PREFERRED EMBODIMENTS

The oxyalkylation catalysts of the subject invention comprise magnesium oxide, which is commercially available in a variety of particle sizes. Preferred particles sizes range from 100 mesh to 1000 mesh, with sizes in the range of 200–500 mesh preferred. Smaller particle sizes provide larger surface area and enhanced dispersibility, the latter therefore requiring less intensive stirring. However, filtration is most rapid and efficient with larger particle sizes. The heterogeneous nature of the catalyst requires that the reaction mixture be agitated, or recirculated to the oxyalkylation reactor, or that the reactants flow through a fixed or fluidized catalyst bed.

The preferred alkylene oxide used in oxyalkylation is propylene oxide, although other alkylene oxides such as 1,2- and 2,3-butylene oxide, ethylene oxide, and higher $C_{5-20}$ alkylene oxides may be used as well, either singly or in admixture. Mixtures of propylene oxide and ethylene oxide are also preferred. When use of more than one alkylene oxide is contemplated, the alkylene oxides may be added at the same time, or sequentially in any order, to form block, random, block-random, and other oxyalkylation products. The amount of alkylene oxide may advantageously range from 0.5 mol to about 10 mol on a hydroxyl equivalent basis, i.e., from 0.5 to 10 mol per mol of hydroxyl functionality in the initiator. Preferably, the amount of alkylene oxide is from 0.5 mol to 5 mol, more preferably 0.8 to 2.5 mol on the aforementioned basis.

The oxyalkylation temperature and pressure are conventional, i.e., similar to that used in conventional base catalysis using potassium hydroxide. Temperatures in the range of about 50° C. to 220° C. are suitable, preferably 70° C. to 160° C., and most preferably in the range of 90° C. to 120° C. Pressures may range from below atmospheric to 100 psi, preferably from 20 to 90 psi.

The time of oxyalkylation is dependent on the amount of alkylene oxide desired to be reacted, and inversely related to the catalyst charge and oxyalkylation temperature. Following completion of the addition of the desired amount of alkylene oxide, the reactor pressure may be monitored to provide an indication of the progress of oxyalkylation. The reactor may be maintained at a suitable oxyalkylation temperature until substantially all alkylene oxide has reacted, or may be vented, allowing unreacted alkylene oxide to escape the reaction vessel. Alkylene oxide addition times advantageously range from 0.5 h to 10 h, preferably 1–9 hours, with "cook-out" times of 0.5 h to 16 h, preferably 0.5 h to 5 h. Addition and cook-out time may be decreased by using a larger amount of catalyst, possible due to the inexpensiveness of the catalyst and its recyclability.

Suitable initiator molecules have functionalities of from 1 to 8 and higher, preferably 2 to 8. The "hydric" functionality is preferably hydroxyl functionality. The initiator molecules are preferably "monomeric" in the sense that they have not been previously oxyalkylated. However, low molecular weight oligomeric oxyalkylation products of such monomeric initiator molecules may be used as well. Non-limiting examples of suitable monomeric initiator molecules include mono- alkanols such as methanol, ethanol, 1-propanol, 2-propanol, 1-butanol, 2-butanol, 2-ethylhexanol, and the like; aliphatic, aromatic and arylaliphatic diols such as ethylene glycol, propylene glycol, 1,2- and 1,4-butanediol, 1,6-hexanediol, 1,8-octanediol, 2,2,4-trimethylpentane-1,5-diol, neopentyl glycol, 1,2-, 1,3-, and 1,4-cyclohexanediol, 1,4-cyclohexanedimethanol, hydroquinone, resorcinol, 4,4'-dihydroxybiphenyl, the bisphenols, e.g., bisphenol A, bisphenol F, and bisphenol S; triols such as trimethylolpropane and glycerine; tetrols such as pentaerythritol; pentols such as α-methylglucoside; hexols such as the simple saccharides, e.g., glucose, fructose, mannose, or sorbitol, and modified saccharides such as hydroxyethylglucoside, and hydroxypropylglucoside; octols such as sucrose; and the like.

Low molecular weight oligomers include diethylene glycol, triethylene glycol, dipropylene glycol, tripropylene glycol, dipentaerythritol, tripentaerythritol, and the like. Higher molecular weight oligomers include the alkylene oxide adducts of the foregoing initiators or amines or diamines such as N,N,N',N'-tetrakis[2-hydroxypropyl] ethylene diamine and the like, with molecular weights of from about 100 Da to about 1500 Da and higher, preferably 100 Da to 1000 Da, especially polyoxyethylene glycols, polyoxypropylene glycols, glycerine-initiated polyoxyethylene and polyoxypropylene polyether polyols, and the like. Preferred initiators are ethylene glycol, diethylene glycol, propylene glycol, dipropylene glycol, glycerine, trimethylolpropane and polyoxyethylated and/or polyoxypropylated polyether oligomers of these initiators having molecular weights in the range of 100 Da to 1500 Da and/or hydroxyl numbers in the range of 3700 to about 100, preferably 1829 to 100. The molecular weights and equivalent weights expressed in Da (Daltons) herein are number average molecular weights.

The reaction advantageously is conducted in a stainless steel or glass-lined pressure vessel equipped with the necessary feed ports and a mechanical stirrer, or a similar vessel in which reactor contents are continuously or discontinuously recirculated via a recirculation pump. Due to the heterogeneous nature of the catalyst, a continuous reactor employing a fixed bed or fluidized bed of solid catalyst may be employed, with initiator introduced at an inlet end along with a first portion of alkylene oxide, with increments of alkylene oxide added at points downstream from the inlet, and product take-off at an outlet end.

The solid oxyalkylation catalysts of the subject invention may be introduced directly into the oxyalkylation reactor, if desired. To assure complete freedom from moisture, the catalysts may be heated to drive off any moisture which they may have absorbed or adsorbed during storage. The catalysts are preferably heated in vacuo for this purpose. Alternatively, the catalyst/starter mixture may be heated in vacuo in the reactor to remove traces of water. In the case where monomeric diols such as ethylene glycol or propylene glycol are used as starter molecules, removal of water may not be required.

Initiator/catalyst master batches may be advantageously used, prepared as described above, and stored in a sealed container until use. To facilitate thorough mixing of catalyst and initiator (starter), a low boiling solvent, preferably one having water solubility or miscibility, may be added to the mixture of catalyst and initiator, following which the solvent is removed by vacuum stripping or distillation. Suitable solvents are, for example, acetone, methylethylketone, N-methylpyrollidone, and tetrahydrofuran.

Following oxyalkylation, the catalyst is filtered from the polyether product. As the catalyst particles are preferably of rather large size, e.g. 200 to 500 mesh, filtration is rapid, and may be accomplished by standard industrial filters such as bag filters, cartridge filters, plate and frame filters, and the like. Centrifugal filters may also be used, as well as combinations of coarse prefilters designed to retain the bulk of the catalyst and a filter of finer pore size to retain any fine particulates.

The catalyst may be recycled, if desired, to be used in a further oxyalkylation. When recycled, the catalyst may be washed with one of the aforementioned solvents to remove traces of polyether product which might otherwise remain in the filter cake, or may be added directly to the oxyalkylation reactor. In the latter case, it is preferable to heat and vacuum strip to remove any traces of moisture which may have accumulated in the catalyst during filtration and/or handling.

The amount of catalyst will affect oxyalkylation time. Amounts of catalyst ranging upwards from about 1 weight percent based on product weight are suitable, with the maximum amount generally limited only by practical concerns. In continuous flow reactors, for example, the amount of catalyst may actually be larger than the amount of reactants and products contained in the reactor at any given time. In the case of batch-type reactions, whether in stirred pressure vessels or recirculating reactors, the amount of catalyst, again based on final product weight, may be from 1 weight percent to 50 weight percent, advantageously 3 weight percent to 30 weight percent, and preferably 5 weight percent to 25 weight percent. Amounts of from about 8 weight percent to 15 weight percent are particularly suitable.

Conventional reactor preparation is utilized. Following introduction of the initiator and solid catalyst charges, the reactor may be heated and stripped, preferably at elevated temperature, to remove traces of water, and purged several times with dry nitrogen. The alkylene oxide is then added with continuous agitation in the case of a stirred reactor, or continuous flow in the case of a recirculating or continuous reactor. Following conclusion of the oxyalkylation, the crude product is filtered to remove traces of solid catalyst.

The filtered polyol contains very little residual metal ions, in general less than 5 ppm, and in particular, less than 1 ppm. The product may be used as is, or may be further oxyalkylated to higher molecular weight products using DMC complex catalysts, without post treatment using acid neutralization, ion exchange treatment, or adsorbents to remove residual catalyst. Polyols prepared in this manner have measured unsaturation of less than 0.020 meq/g, preferably less than about 0.015 meq/g, more preferably less than about 0.010 meq/g, and in particular, 0.007 meq/g or less.

Having generally described this invention, a further understanding can be obtained by reference to certain specific examples which are provided herein for purposes of illustration only and are not intended to be limiting unless otherwise specified.

EXAMPLE 1

To 200 glycerine (hydroxyl No. 1829) in a rotoevaporator flask was added 100 g MgO (Aldrich, 325 mesh, calcined, 99+ % purity) and 200 g tetrahydrofuran (THF). The rotoevaporator contents were mixed well and THF removed in vacuo. An additional 200 g glycerine was then added to form an initiator/catalyst mixture containing 20 weight percent magnesium oxide. A stainless steel stirred autoclave was charged with 200 g of the initiator/catalyst mixture, pressurized with dry nitrogen to 30 psig and purged to full vacuum (−14 psig), this procedure being repeated a total of three times. Full vacuum was applied to the reactor as it was heated to 110° C. with the stirrer at 733 rpm. Propylene oxide was added at a pressure of from 70–90 psi over a period of 9 hours, following which a cook-out of 16 hours at 130°–140° C. was used to react the majority of propylene oxide. The reactor was vented, and the contents were cooled and filtered. The resulting polyol product had a hydroxyl number of 643, an unsaturation of 0.003 meq/g polyol, and contained less than 1 ppm magnesium.

EXAMPLES 2 to 6

In a manner similar to Example 1, polyols were produced from a variety of initiators with magnesium oxide as catalyst. The reaction conditions and product physiochemical properties are presented in Table 1. In Table 1, the build ratio is the calculated ratio of product molecular weight to initiator molecular weight. $M_n$ and $M_w$ are the number average molecular weight and weight average molecular weight, respectively, of the product, while $M_w/M_n$ is the product polydispersity. Unsaturation is measured by titration in accordance with ASTM test method D-2849-69. Percent catalyst is the weight percent relative to the obtained product weight.

TABLE 1

| EXAMPLE | 1 | 2 | 3 | 4 | 5 | 6 |
|---|---|---|---|---|---|---|
| Type | Slurry | Slurry | Slurry | Slurry | Slurry | Slurry |
| Reactor Temp (°C.) | 110 | 160 | 120 | 110 | 100 | 160 |
| STARTER | | | | | | |
| OH# | 1829[1] | 264[4] | 108[3] | 238[2] | 108[3] | 1829[1] |
| Charge (g) | 160 | 214 | 216 | 160 | 200 | 160 |
| Catalyst | MgO 325 | MgO 325 | MgO 325 | MgO 325 | MgO 325 | MgO 325 |
| Catalyst (g) | 40 | 54 | 54 | 80 | 100 | 40 |
| Build Ratio | 3.00 | 1.87 | 1.89 | 3.76 | 1.50 | 4.00 |
| PO Feed Time (hour) | 9.00 | 2.00 | 4.00 | 9.00 | 4.30 | 8.00 |
| Cook-Out (hour) | 16.00 | 1.00 | 5.00 | 7.00 | 0.50 | 3.50 |
| OH# Polyol | 643 | 166 | 82 | 73.7 | | 450 |

TABLE 1-continued

| EXAMPLE | 1 | 2 | 3 | 4 | 5 | 6 |
|---|---|---|---|---|---|---|
| Unsat. Polyol |  | 0.077 | 0.063 | 0.083 |  |  |
| $M_n$ |  | 740 | 1320 | 6574 |  |  |
| $M_w$ |  | 850 | 1640 | 8733 |  |  |
| $M_w/M_n$ |  | 1.13 | 1.24 | 1.328 |  |  |
| % Catalyst | 6.7 | 10.7 | 10.6 | 8.8 | 22.0 | 5.1 |

[1]Glycerine;
[2]LHT-240, an oxypropylated glycerine available from ARCO Chemical Co.;
[3]PPG-1025, polyoxypropylene diol with nominal 1000 Da molecular weight;
[4]PPG 425, polyoxypropylene diol, c.a. 425 Da molecular wt.

COMPARATIVE EXAMPLE A

Calcium hydroxide was calcined at 400° C. for 6 hours to prepare a calcium oxide catalyst. Catalyst in the amount of 150 g was slurried in 300 g PPG-1025 and 360 g of this mixture oxypropylated with propylene oxide as described in Examples 1–6, the reactor temperature being 110° C. The reaction was allowed to proceed for in excess of 4 days. Following stripping at maximum vacuum, crude product weight (including catalyst) was only 563 g, representing approximately 443 g polyol after filtering (Whatman #1 filter paper) to remove catalyst. Due to the small amount of weight increase and long reaction time, the polyol product was not analyzed.

COMPARATIVE EXAMPLE B

Basic aluminum oxide (Aldrich), 150 g, was employed as a catalyst with 700 g PPG-1025 in a plug flow reactor. Reaction temperature was 140° C., flow rate at 50 ml/min, and propylene oxide feed rate at 3.0 g/min. At this rate of feed, pressure would rise to c.a. 60–70 psig at which time the propylene oxide feed was interrupted and allowed to "cook out" to a lower pressure following which feed was restarted. The reactor was stripped, cooled, and product collected. The product, following refining, has a hydroxyl number of c.a. 108, approximately the same as the initiator polyol. The crude product gelled over time but could be clarified upon heating to 100° C. for 2 hours, only to gel once more upon cooling. Refined product also gelled.

EXAMPLE 8

Potassium hexacyanocobaltate (8.0 g) was added to deionized water (150 mL) in a beaker, and the mixture blended with a homogenizer until the solids dissolved. In a second beaker, zinc chloride (20 g) was dissolved in deionized water (30 mL). The aqueous zinc chloride solution was combined with the solution of the cobalt salt using a homogenizer to intimately mix the solutions. Immediately after combining the solutions, a mixture of tert-butylalcohol (100 mL) and deionized water (100 mL) was added slowly to the suspension of zinc hexacyanocobaltate, and the mixture homogenized for 10 min. The solids were isolated by centrifugation, and were then homogenized for 10 minutes with 250 mL of a 70/30 (v:v) mixture of t-butylalcohol and deionized water. The solids are again isolated by centrifugation, and finally homogenized for 10 minutes with 250 mL of t-butylalcohol. The catalyst was isolated by centrifugation, and dried in a vacuum oven at 50° C. and 30 in. (Hg) to constant weight.

A high molecular weight, low unsaturation polyether polyol is prepared using double metal cyanide complex catalyzed oxyalkylation of the oligomeric polyether prepared in accordance with Example 1. A two-gallon stirred reactor is charged with the c.a. 650 Da polyoxypropylene triol starter prepared in accordance with Example 1 and the zinc hexacyanocobaltate complex catalyst at a level corresponding to 250 ppm in the finished polyol. The mixture is stirred and heated to 105° C., and is stripped under vacuum to remove traces of water from the starter. A minor amount of propylene oxide is fed to the reactor, initially under a vacuum of 30 in. (Hg), and the reactor pressure is monitored carefully. Additional propylene oxide is not added until an accelerated pressure drop occurs in the reactor; the pressure drop is evidence that the catalyst has become activated. When catalyst activation is verified, sufficient propylene oxide to result in a 6000 Da polyoxypropylene triol product is added gradually over about 2 h while maintaining a reactor pressure less than 40 psi. After propylene oxide addition is complete, the mixture is held at 105° C. until a constant pressure is observed. Residual unreacted monomer is then stripped under vacuum from the polyol product. The hot polyol product is filtered at 100°0 C. through a filter cartridge (0.45 to 1.2 microns) attached to the bottom of the reactor to remove the catalyst. The product polyol has a hydroxyl number of c.a. 28 and a measured unsaturation of less than about 0.005 meq/g unsaturation per gram of polyol.

Having now fully described the invention, it will be apparent to one of ordinary skill in the art that many changes and modifications can be made thereto without departing from the spirit or scope of the invention as set forth herein.

What is claimed is:

1. A process for the preparation of a polyoxyalkylene polyether having low unsaturation, comprising:
   (a) preparing an oligomeric polyoxyalkylene polyether by;
      (1) contacting a hydroxyl-functional starter having a first molecular weight with a catalytically effective amount of a solid, essentially insoluble oxyalkylation catalyst consisting essentially of magnesium oxide having a particle size of from 100 to 1000 mesh, wherein said amount of magnesium oxide is about 1 weight percent or more based on the weight of said oligomeric polyoxyalkylene polyether;
      (2) oxyalkylating said starter with one or more alkylene oxides to form an oligomeric polyoxyalkylene polyether of second molecular weight, said second molecular weight being higher than said first molecular weight; and
      (3) separating said solid oxyalkylation catalyst from said oligomeric polyoxyalkylene polyether;
   (b) adding to said oligomeric polyoxyalkylene polyether a catalytically effective amount of a double metal cyanide complex catalyst;
   (c) oxyalkylating said oligomeric polyoxyalkylene polyether with one or more alkylene oxides; and
   (d) recovering a polyoxyalkylene polyether having an unsaturation lower than 0.020 meq/g and a molecular weight higher than the molecular weight of said oligomeric polyoxyalkylene polyether.

2. The process of claim 1 wherein said oxyalkylating step (c) is performed with an alkylene oxide selected from the group consisting of propylene oxide, and a mixture of propylene oxide and ethylene oxide.

3. The process of claim 1 wherein said double metal cyanide complex catalyst is a non-stoichiometric substantially amorphous catalyst having zinc hexacyanocobaltate and t-butyl alcohol.

* * * * *